United States Patent
Kounavis (10) Patent No.: US 10,496,876 B2
(45) Date of Patent: Dec. 3, 2019

(54) SPECULAR LIGHT SHADOW REMOVAL FOR IMAGE DE-NOISING

(71) Applicant: Intel Corporation, Santa Clara, CA (US)

(72) Inventor: Michael Kounavis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/198,173

(22) Filed: Jun. 30, 2016

(65) Prior Publication Data

US 2018/0005023 A1    Jan. 4, 2018

(51) Int. Cl.
*G06K 9/00* (2006.01)
*G06K 9/62* (2006.01)
*G06K 9/46* (2006.01)
*G06T 5/00* (2006.01)
*G06T 5/40* (2006.01)
*G06T 7/246* (2017.01)
*G06K 9/40* (2006.01)

(52) U.S. Cl.
CPC .......... *G06K 9/00335* (2013.01); *G06K 9/40* (2013.01); *G06K 9/4642* (2013.01); *G06T 5/008* (2013.01); *G06T 5/40* (2013.01); *G06T 7/246* (2017.01); *G06T 2207/20012* (2013.01); *G06T 2207/20021* (2013.01); *G06T 2207/20032* (2013.01)

(58) Field of Classification Search
None
See application file for complete search history.

(56) References Cited

U.S. PATENT DOCUMENTS

| | | | | |
|---|---|---|---|---|
| 8,189,913 B2 * | 5/2012 | Huang | .................. | G06K 9/4642 382/103 |
| 2007/0031055 A1 * | 2/2007 | Golan | ..................... | G06T 5/009 382/254 |
| 2008/0037868 A1 * | 2/2008 | Han | ........................ | G06T 5/009 382/169 |

(Continued)

OTHER PUBLICATIONS

Jyothisree V. And Smitha Dharan, "Shadow Detection Using Tri-color Attenuation Model Enhanced With Adaptive Histogram Equalization", International Journal of Computer Science & Information Technology (IJCSIT) vol. 5, No. 2, Apr. 2013, pp. 147-155.*

(Continued)

*Primary Examiner* — Randolph I Chu
(74) *Attorney, Agent, or Firm* — Green, Howard & Mughal LLP.

(57) ABSTRACT

Specular light shadow removal is described for use in image de-noising. In one example a method includes placing a window on an image, determining a cumulative distribution function for the window, determining a destination histogram for the window, determining a cumulative distribution function for the destination histogram, replacing the intensity of a pixel with the smallest index for which the histogram distribution for the pixel is greater than the window distribution, repeating determining a cumulative distribution function, a destination histogram, and a cumulative distribution function and replacing the intensity for a plurality of windows of the image, and de-noising the image after repeating by applying a median filter to the image.

20 Claims, 4 Drawing Sheets

(56) References Cited

U.S. PATENT DOCUMENTS

| | | | | |
|---|---|---|---|---|
| 2008/0272999 | A1* | 11/2008 | Kurokawa | G09G 3/3406 345/89 |
| 2009/0161953 | A1* | 6/2009 | Ciurea | H04N 1/4074 382/172 |
| 2010/0080459 | A1* | 4/2010 | Dai | G06T 5/009 382/170 |
| 2010/0278423 | A1* | 11/2010 | Itoh | G06T 5/008 382/169 |
| 2016/0180504 | A1 | 6/2016 | Kounavis | |
| 2016/0196640 | A1* | 7/2016 | Kino | G06T 5/40 348/234 |
| 2016/0335750 | A1* | 11/2016 | Usman | G06T 5/008 |
| 2017/0024865 | A1* | 1/2017 | Suzuki | G06T 5/00 |
| 2017/0257551 | A1* | 9/2017 | Meuter | H04N 19/428 |
| 2018/0061029 | A1* | 3/2018 | Suzuki | H04N 1/407 |

OTHER PUBLICATIONS

Corke et al., "Dealing with Shadows: Capturing Intrinsic Scene Appearance for Image-based Outdoor Localisation", Intelligent Robots and Systems (IROS), 2013 IEEE/RSJ International Conference.*

Sasi et al., "Shadow Detection and Removal from Real Images : State of Art", WCI '15, Aug. 10-13, 2015, Kochi, India 2015 ACM., pp. 309-317.*

Adaptive histogram equalization, Wikipedia (Year: 2016).*

Hansen F. Chen et al., "In Search of Illumination Invariants," paper, IEEE Conference on Computer Vision and Pattern Recognition, Jun. 2000, 37 pages.

Graham D. Finlayson, et al., "Removing Shadows from Images," paper, School of Information Systems, The University of East Anglia, Norwich, England, 14 pages.

Derek Hoiem, et al., "Recovering Surface Layout from an Images," paper, International Journal of Computer Vision, 2007, pp. 151-172.

Taeone Kim, et al., "A Practical Single Image Based Approach for Estimating Illumination Distribution from Shadows," paper, POSTECH, Republic of Korea, Proceedings of the Tenth IEEE International Conference on Computer Vision, 2005, 6 pages.

Jean-Francois Lalonde, et al., "Estimating Natural Illumination from a Single Outdoor Image," paper, School of Computer Science, Carnegie Mellon University, 8 pages.

Imari Sato, et al., "Illumination from Shadows," paper, IEEE Transactions on Pattern Analysis and Machine Intelligence, vol. 25, No. 3, Mar. 2003, pp. 290-300.

* cited by examiner

SPECULAR LIGHT SHADOW REMOVAL FOR IMAGE DE-NOISING

FIELD

The present description relates to digital image processing and in particular to processing operations related to reducing shadows for de-noising images.

BACKGROUND

Small digital cameras continue to increase in accuracy, detail, and speed and are often accompanied by or accessed by substantial computing resources. These small cameras find use in a wide range of different products such as watches, eyewear, helmets, computing tablets, media players, cellular telephones, computers, and work stations of all kinds. In addition to consumer gear, such cameras are being used in professional and industrial field as well for machine vision and many other applications.

For imaging, machine learning systems, and machine vision functionality shadows can interfere with a system's ability to detect and recognize an object. As an example, for hand gesture recognition, different fingers and finger positions may not be visible due to shadows. This may cause a failure of the detection and recognition system or an erroneous interpretation of a gesture.

In some cases shadows are addressed by trying to estimate the shadow and then compensate for it. As an example, the position and intensity of the light source is projected based on an image. Based on the projection, an estimated shadow is removed using information about object geometry. Another approach analyzes an image for luma gradients with constant chroma values. As in the other case, the object texture and geometry are used to estimate and remove shadow. With shadows accurately removed, the gesture recognition system or any other machine vision system operates more reliably and accurately.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

As described herein light shadows may be removed from images without using any information about the location and direction of light sources. Shadows are successfully removed even if the absolute value of the intensity changes in the luma component of the image vary significantly. No knowledge about the object texture and geometry is required. Results are best with objects that are predominantly diffuse reflectors.

In computer vision systems, recall and precision rates are greatly improved by removing shadows and other non-uniform illumination effects originating from arbitrary point light sources. The described system converts object representations from some arbitrary input lighting conditions to ideal "studio lighting" conditions. This preserves object details which may be useful for successful object recognition while eliminating confusing effects. For many objects, the recognition process is aided by diffuse shading which is caused by surface anomalies in areas such as fingers, lips, chin, or cheeks. Directional and specular shading, on the other hand, create undesirable shadows that hinder recognition.

Light reflected from a surface may be categorized into three classes, to describe the way that it is reflected from the surface. First, ambient light is typically independent of the light source position and surface angle. Second, diffuse light is independent of the position of the light source but depends only on the surface angle and specifically the direction of the orthonormal vector on the surface of the object. Anomalies on an object's surface typically result in visible changes in the intensity of diffuse light. These changes are referred to as diffuse shading. Third, directional and specular light depends on both the light source position and the surface angle. Shadows caused by other objects or other portions of the surface between a directional or specular light source and the surface affect the recall and precision of object detectors, especially in indoor environments. Furthermore, other non-uniform illumination effects including shadows originating from ambient light may be undesirable too. On the other hand, diffuse shading caused by anomalies in an object's surface is desirable because it creates object landmarks aiding the recognition process.

The techniques described herein remove shadows associated with arbitrary point sources and non-uniform illumination effects while keeping and strengthening diffuse shading. No knowledge of or assumption about the objects to be recognized is needed. Better results are obtained with objects that are predominantly diffuse reflectors. Human skin is a diffuse reflector so the described techniques work well with hand gesture recognition systems in environments with varying indoor lighting, among other applications.

Areas that are covered with diffuse shading frequently appear to be darker than areas covered by shadows coming from spot light sources. The diffuse areas may be one half to one quarter the brightness of the specular shadows. The diffuse shading areas tend to correspond to landmarks on the surface. Specular shadows correspond to interference from other objects. Different circumstances and objects will show different luminance value boundaries that diffuse shading from specular shadows. These boundaries will also separate useful landmarks from undesirable or useless ones. On the other hand, in most circumstances the diffuse shading areas that are useful to machine learning and object recognition systems are darker than the shadows that inhibit object recognition. The diffuse shading effects are helpful because they are usually caused by anomalies which are right on an object's surface. On the other hand specular shadows are usually caused by objects that are not a part of the object and in some cases are far away from the object under consideration.

As mentioned, in actual images the diffuse shading areas may be one half to one quarter the brightness of the specular shadows. The exact range of luminance values of each area type depends on the particular image and the environment in which the image is captured. For this reason, the absolute values of the pixel intensities are not as useful as the relative ranking of each pixel intensity value inside a local window. Adaptive histogram specification techniques allow the relative rankings for a given image to be enhanced. Adaptive histogram specification provides a more aggressive image enhancement than histogram equalization, although either technique may be used. The image enhancement pushes areas with undesirable shadows into the bright range, while keeping dark areas with desirable landmarks dark. Adaptive histogram specification increases image noise at each stage, however, this may be overcome with image de-noising. A de-noising algorithm technique that preserves the edge details of an image is particularly suitable for this.

Figure 1:
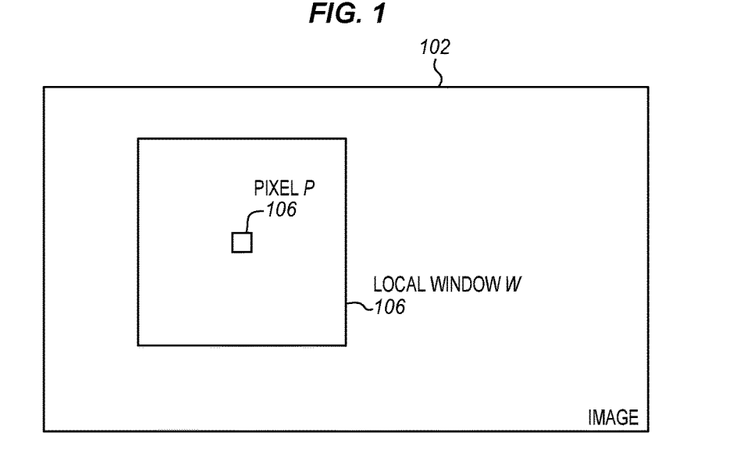
FIG. 1 is a diagram of an image array of pixels with a sliding window and a pixel in the window according to an embodiment.

As mentioned above, an adaptive histogram specification stage is used to distinguish diffuse shading from specular shadows. An example of an adaptive histogram specification is shown in FIG. 1. FIG. 1 is a diagram of an image with a local window. An image 102 is received from memory or from a camera. In a gesture recognition system, the image comes directly from a camera while the user is gesturing in front of the camera. For machine visions systems, objects other than gestures may be imaged by the camera. The camera may be conventional or it may be a depth camera, an infrared camera, or some other type of camera or the image may be augmented with infrared or other colors, depth information or other information.

A local window w is placed on the image. The local window includes a pixel p. A cumulative window distribution function S( ) is then computed on the local window w around the pixel p. The local window size may reflect the expected object size, associated with the size of an image in a pyramid level. A second cumulative destination distribution function D( ) is also computed on a destination histogram. Finally, the intensity of pixel p is replaced with the smallest index i for which $D(i) \geq S(p)$. In some embodiments, a linear histogram is used. This linear histogram has slope equal to −1 for inputs between 0 and 128 and a slope equal to 1 for inputs between 128 and 255.

Figure 2:
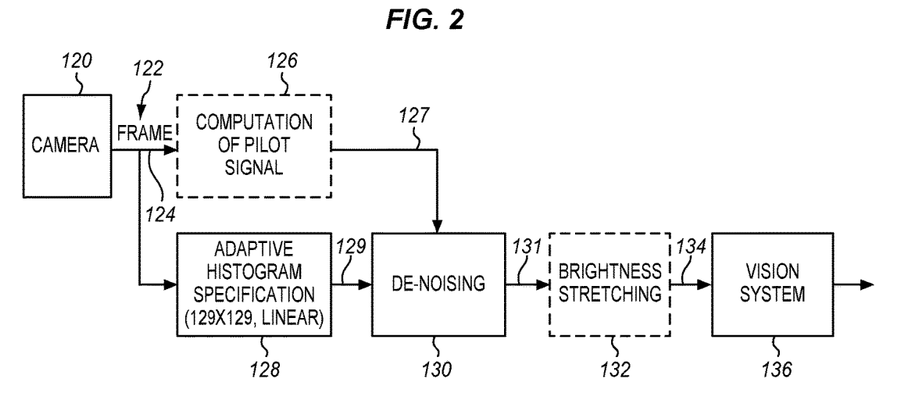
FIG. 2 is a block diagram of a pipeline for shadow removal according to an embodiment.

This technique is shown in more detail in FIG. 2. FIG. 2 is a block diagram of a pipeline for shadow removal. The pipeline receives one or more input frames 122 or images, typically as a video sequence. The resolution and configuration of the frames may be adapted to suit the particular implementation. The frames may also be cropped. As an example, for a gesture recognition system there may be a limited gesture location for gestures to be made which is less than the entire camera field of view. The rest of the camera field of view may then be removed. Similarly, if a user is performing gestures in a particular part of the camera's field of view, the camera may be configured to recognize the gestures and then crop out much of the rest of the frame.

The input frame may be received at a pilot signal block 126 from an input 124. The input may be coupled to a camera or cameras 120, a buffer, an image processor, or another device. The pilot signal block generates a pilot signal 127 that is used for some types of de-noising. For other embodiments, the de-noising does not use a pilot signal. For other embodiments, there is no de-noising.

The frame 122 is also received from the input 124 at an adaptive histogram specification stage 128 of the pipeline. In this embodiment, image enhancement is performed adaptively on a per pixel basis. In some embodiments, pixel values of 129×129 square neighborhoods around each pixel are used in the adaptive histogram specification. For other implementations, the histogram specification windows may be smaller or larger. The particular neighborhood size may be selected to suit performance and power constraints of any particular design.

The adaptive histogram specification stage strengthens the image details that are helpful to machine learning-based detection. As an example, the dark areas between the fingers of a hand are strengthened, removing other shadows. This is particularly useful for hand and gesture recognition. The result is a histogram-enhanced frame 129.

The adaptive histogram specification stage as with many histogram-based techniques amplifies noise. Amplified noise speckles appear as smudges and other shapes. These noise marks may be confused for relevant features so that the recognition or vision system fails to accurately detect the image object. To reduce the added noise issue, the histogram enhanced frame 129 is transferred to a de-noising block 130 which is the next block in the pipeline.

The de-noising block 130 also receives the pilot signal 127. Any of a variety of different de-noising techniques may be used. In some embodiments, a non-linear function n( )= and median filters are used to de-noise the enhanced frame.

The de-noising operation may be performed in any of a variety of different ways. In some embodiments, and equalized gradient space is used. An intelligent smoothing filter blurs each pixel separately using a different blurring radius each time. The blurring radius is determined differently for different circumstances. The more likely a pixel is an edge pixel, or the closer a pixel is to an important edge, the smaller the blurring radius is. Conversely, the less likely a pixel is an edge pixel or the farther a pixel is away from an important edge, the larger the blurring radius is. The blurring radius may be used for example to refer to the standard deviation parameter σ of a Gaussian kernel used in local smoothing operations.

The blurring radius for a pixel starts with a gradient magnitude associated with an input image. The gradient magnitude may be determined by convolving the input image with first order Gaussian derivatives associated with some standard deviation parameter σI. Standard deviation σI may be determined so that it is in the same order as the average speckle of the noise that is to be removed. The gradient magnitude signal is passed through an equalization operation which includes a cumulative distribution function followed by a stretching operation to some range such as 0-255. The stretching operation extends or reduces all values obtained by applying the equalization function to fill a predefined range. 255 corresponds to 8 bits which is often the number of bits used for pixel values in an image. However, other ranges may be used instead. The resulting signal, which is called an equalized gradient herein, is then corrected by applying some median filter. The size of the median filter depends on the Gaussian derivative standard deviation parameter σI. The output of this median filter is the de-noising pilot of block 126 above.

The equalized gradient, after being corrected through some median filter, may be used directly for specifying blurring radii that can potentially eliminate noise, while preserving many fine image details like hair, wrinkles etc. The de-noising of the input image may be completed by passing the de-noising pilot through some non-linear function. The function may be related to the camera or image sensor characteristics and the overall level of illumination in the image. This function returns the blurring radius that was used for each pixel. In some embodiments functions are used that typically return some reasonably large constant blurring radius value for inputs smaller than a first threshold T1. The function reduces the blurring radius rapidly, up to inputs equal to a second larger threshold T2. The function keeps the outputs constant, such as a low or zero radius value for the input values greater than the second threshold.

The de-noising process is completed using a second median filter which is applied on the output of the blurring stage. This second median filter is used for eliminating smaller speckles which may not have been filtered by the previous operations, due to the blurring operation being based on the equalized gradient magnitude signal. The size of the second median filter may be determined based on the standard deviation parameter GI.

The de-noised, enhanced frame 131 is passed to the next stage, an optional brightness enhancement stage 132. The brightness enhancement is an optional operation and may be done in any of a variety of different ways. The brightness enhancement works to boost contrast and perhaps also to increase the dynamic range of the image. In some embodiments, this stage uses a parabolic curve and a transfer function. The transfer function has a fixed α parameter to define the transfer function's curvature and a fixed destination range $\omega_0$. This stage receives as input the minimum pixel intensity, min, the maximum pixel intensity, max, and a pixel intensity value v. A brightness enhanced pixel intensity u is determined from v using the operations below:

$$\text{if } 255 - \omega_0 > \min \text{ then } F \leftarrow \min, \omega \leftarrow 255 - \min \quad \text{Eq. 1}$$
$$\text{else } F \leftarrow 255 - \omega_0, \omega \leftarrow \omega_0$$

$$U \leftarrow \omega \cdot \frac{v - \min}{\max - \min} \quad \text{Eq. 2}$$

$$A \leftarrow \frac{a}{2\omega} \quad \text{Eq. 3}$$

$$B \leftarrow \frac{Ua}{\omega} - \alpha - 1 \quad \text{Eq. 4}$$

$$C \leftarrow \frac{U^2 a}{2\omega} - Ua + U \quad \text{Eq. 5}$$

$$u \leftarrow F + \frac{-B - \sqrt{B^2 - 4AC}}{2A} \quad \text{Eq. 6}$$

A final image 134 is produced by the brightness stretching stage. This is passed to a vision system 136, such as a gesture recognition, object detection, or control system of any of a variety of different types. This system is sufficiently efficient to operate in real time gesture recognition on commonly available computing hardware platforms.

The described approach provides much improved reliability for products that support imaging, machine learning systems, or machine vision functionality. The technique is simple, very efficient and can be realized in many different ways ranging from microcode and firmware to higher level software and specialized logic. In addition, no knowledge about the object texture and geometry is required.

Figure 3:
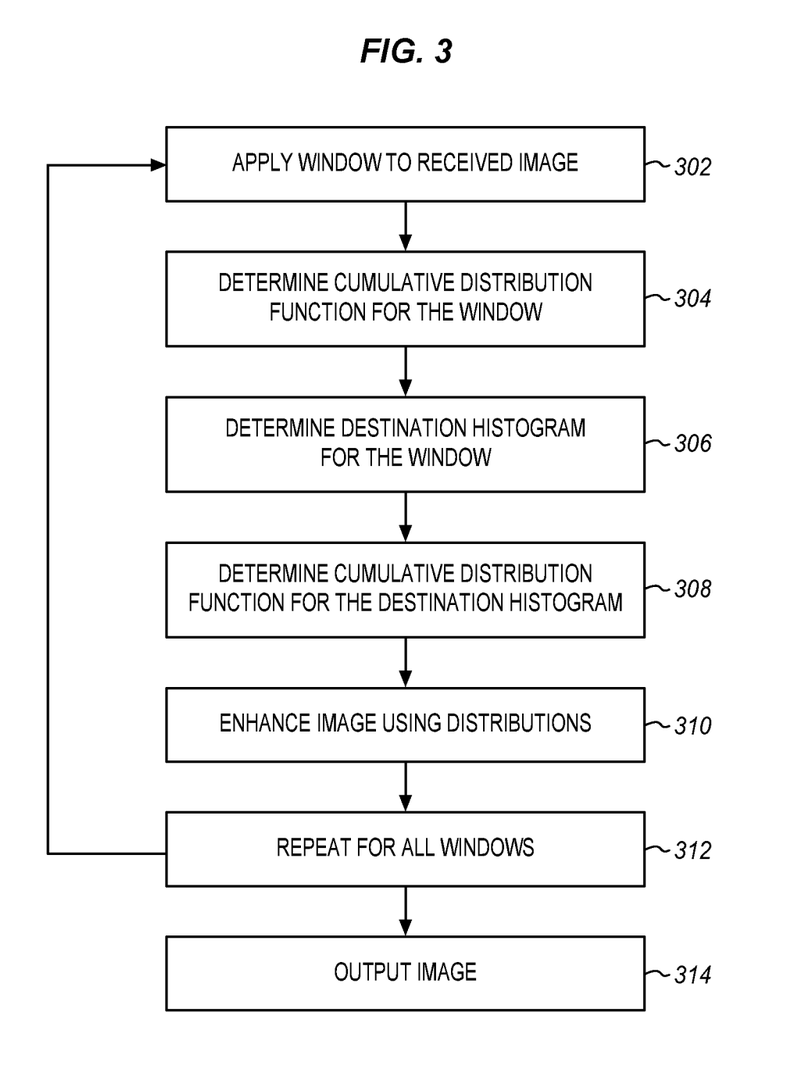
FIG. 3 is a process flow diagram of a method for removing specular shadows according to an embodiment.

FIG. 3 is a process flow diagram of a method for removing specular shadows from an image without removing diffuse shading. The input image is received and at 302 a window is placed on the image. Typically, this is the first of many sliding windows that cover the entire image. Alternatively, there may be a single window for an identified shadow area. At 304 a cumulative distribution function is determined for the window. At 306 a destination histogram is determined for the window. At 308 a cumulative distribution function is determined for the destination histogram.

The distribution functions allow image enhancement to be performed adaptively on a per pixel basis. At 310 the image is enhanced using the distribution functions for example by replacing the intensity of a pixel with the smallest index for which the histogram distribution for the pixel is greater than the window distribution. This is repeated for all of the shadow pixels and for all of the windows at 312 to produce an output image at 314 with reduced or eliminated specular shadows.

Figure 4:
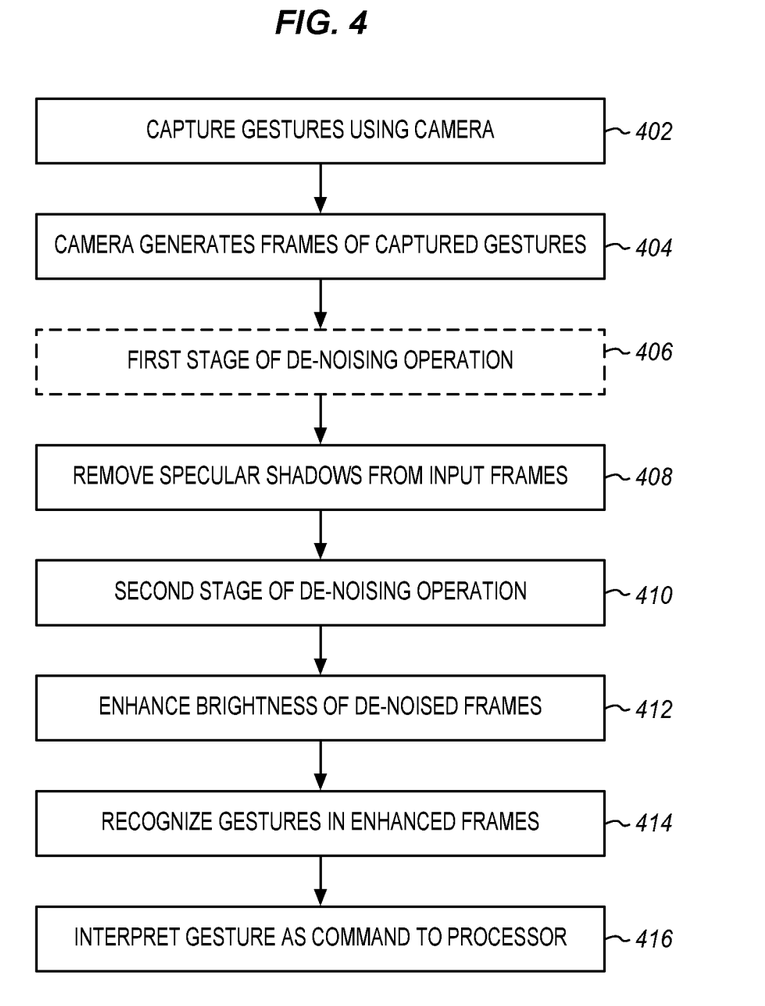
FIG. 4 is a process flow diagram of recognizing gestures according to an embodiment.

FIG. 4 is a process flow diagram of performing gesture recognition using the shadow removal of FIG. 3. At 402 gestures are captured by a camera. The gestures may be hand gestures, face gestures, body gestures, or any other type of gesture, depending on the nature of the gesture system and the purpose of the gestures. At 404 the camera generates one or more input frames of the gestures. While a video sequence is typically used in gesture recognition systems, the particular type of and number of frames may be adapted to suit the particular system.

At 406 the input frames are received at a first stage of a de-noising process. Here a pilot signal is generated for the image de-noising. At 408 the input frames are received at a specular shadow removal block. The shadow removal may be performed as described above with respect to FIG. 3. At 410 the frames with the specular shadows removed are passed to a second stage of the de-noising. The second stage uses the pilot signal and the received frames to de-noise the frames.

At 412 the brightness of the frames is enhanced. The brightness enhancement may be done in any of variety of different ways. Generally, the intensity of each pixel is compared to the range of pixel brightnesses. Bright pixels are made brighter and dark pixels are made darker to expand the overall dynamic range of the image.

At 414 the enhanced frames are passed to a machine vision system. The machine vision system performs gesture recognition, object detection, or any of a variety of other operations. At 416 the recognized gesture is interpreted and a command is generated to be operated on by a processor of the system.

Figure 5:
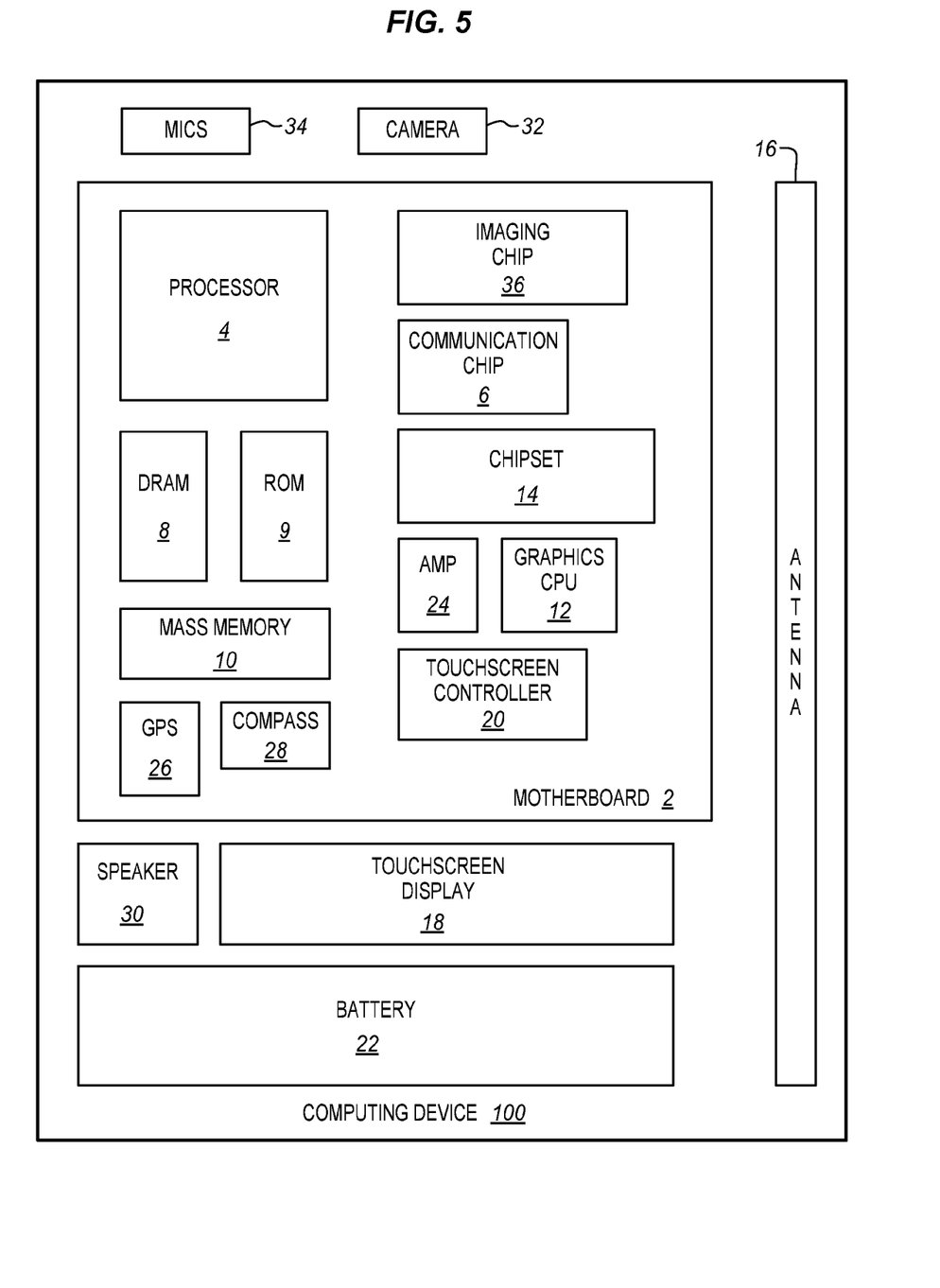
FIG. 5 is a block diagram of a photographic device incorporating specular shadow removal according to an embodiment.

FIG. 5 illustrates a portable image capture device 100 in accordance with one implementation. The imaging device 100 houses a system board 2. The board 2 may include a number of components, including but not limited to a processor 4 and at least one communication package 6. The communication package may be coupled to one or more antennas 16. The processor 4 is physically and electrically coupled to the board 2.

Depending on its applications, image capture device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, one or more cameras 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36, such as an imaging signal processor and to the processor 4, either directly or through the image chip. The image chip may take a variety of different forms, such as a graphics co-processor, or a separate dedicated imaging management module. Such a module or device may comprise logic, algorithms, and/or instructions operative to capture, process, edit, compress, store, print, and/or display one or more images. These processes may include de-noising, image recognition, image enhancement and other processes described herein. In some embodiments, the imaging management module may comprise programming routines, functions, and/or processes implemented as software within an imaging application or operating system. In various other embodiments, the imaging management module may be implemented as a standalone chip or integrated circuit, or as circuitry comprised within the processor, within a CPU, within a graphics chip or other integrated circuit or chip, or within a camera module.

The communication package 6 enables wireless and/or wired communications for the transfer of data to and from the video device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The video device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 may include all of the components of the camera or share resources, such as memory 8, 9, 10, processing 4 and user interface 12, 20, with other video device components and functions. The processor 4 is coupled to the camera and to memory to receive frames and perform shadow removal and to produce enhanced images for machine vision as described. The cameras may also include an image processing system, as described above, to share tasks with the processor 4 to generate enhanced or de-noised images.

In various implementations, the image capture device 100 may be a video camera, a digital single lens reflex or mirror-less camera, a cellular telephone, a media player, laptop, a netbook, a notebook, an ultrabook, a smartphone, a wearable device, a tablet, a personal digital assistant (PDA), an ultra mobile PC, or a digital video recorder. The image capture device may be fixed, portable, or wearable. In further implementations, the image capture device 100 may be any other electronic device that records a sequence of image frames and processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method of placing a window on an image, determining a cumulative distribution function for the window, determining a destination histogram for the window, determining a cumulative distribution function for the destination histogram, replacing the intensity of a pixel with the smallest index for which the histogram distribution for the pixel is greater than the window distribution, repeating determining a cumulative distribution function, a destination histogram, and a cumulative distribution function and replacing the intensity for a plurality of windows of the image, and de-noising the image after repeating by applying a median filter to the image.

In further embodiments the histogram is linear.

In further embodiments the linear histogram has a negative slope for a lower half of possible input values and a positive slope for a higher half of possible input values.

In further embodiments the destination histogram has a neighborhood around the pixel.

In further embodiments de-noising comprises applying a non-linear function to the image.

In further embodiments de-noising comprises generating a pilot signal before replacing the intensity of the pixel and applying the pilot signal to the de-noising.

In further embodiments the pilot signal comprises an equalized gradient magnitude corrected using a median filter.

In further embodiments the pilot signal determines a blurring radius for each pixel of the image to which de-noising is applied.

Further embodiments include applying brightness enhancement to the image after de-noising to enhance the contrast of the image.

In further embodiments the brightness enhancement uses transfer function with a curvature and a fixed destination range.

Further embodiments include receiving the image from a camera of a computer gesture recognition system, performing image de-noising using the image with the replaced pixel intensity, and performing gesture recognition on the image after de-noising.

Some embodiments pertain to a computer-readable medium having instructions stored thereon that when operated on by the computer cause the computer to perform operations that include placing a window on an image, determining a cumulative distribution function for the window, determining a destination histogram for the window, determining a cumulative distribution function for the destination histogram, replacing the intensity of a pixel with the smallest index for which the histogram distribution for the pixel is greater than the window distribution, repeating determining a cumulative distribution function, a destination histogram, and a cumulative distribution function and replacing the intensity for a plurality of windows of the image, and de-noising the image after repeating by applying a median filter to the image.

In further embodiments the destination histogram has a neighborhood around the pixel.

In further embodiments de-noising comprises applying a non-linear function to the image.

In further embodiments de-noising comprises generating a pilot signal before replacing the intensity of the pixel and applying the pilot signal to the de-noising, wherein the pilot signal comprises an equalized gradient magnitude corrected using a median filter and wherein the pilot signal determines a blurring radius for each pixel of the image to which de-noising is applied.

Further embodiments include applying brightness enhancement to the image after de-noising to enhance the contrast of the image.

Further embodiments include receiving the image from a camera of a computer gesture recognition system, performing image de-noising using the image with the replaced pixel intensity, and performing gesture recognition on the image after de-noising.

Some embodiments pertain to a computing system that include a camera to capture an image, an image processor to placing a window on the captured image, to determine a cumulative distribution function for the window, to determine a destination histogram for the window, to determine a cumulative distribution function for the destination histogram, to replace the intensity of a pixel with the smallest index for which the histogram distribution for the pixel is greater than the window distribution, to repeat determining a cumulative distribution function, a destination histogram, and a cumulative distribution function and replacing the intensity for a plurality of windows of the image, and to de-noise the image after repeating by applying a median filter to the image, and a vision system to recognize a gesture in the de-noised image.

Further embodiments include a processor to receive the recognized gesture and operate on a command based thereon.

In further embodiments the image processor is further to enhance the brightness of the image after de-noising by applying a transfer function with a curvature and a fixed destination range.

Some embodiments pertain to an apparatus that includes means for placing a window on an image, means for determining a cumulative distribution function for the window, means for determining a destination histogram for the window, means for determining a cumulative distribution function for the destination histogram, means for replacing the intensity of a pixel with the smallest index for which the histogram distribution for the pixel is greater than the window distribution, means for repeating determining a cumulative distribution function, a destination histogram, and a cumulative distribution function and replacing the intensity for a plurality of windows of the image, and means for de-noising the image after repeating by applying a median filter to the image.

In further embodiments the destination histogram has a neighborhood around the pixel.

In further embodiments the means for de-noising applies a non-linear function to the image.

In further embodiments the means for de-noising generates a pilot signal before replacing the intensity of the pixel and applies the pilot signal to the de-noising, wherein the pilot signal comprises an equalized gradient magnitude corrected using a median filter and wherein the pilot signal determines a blurring radius for each pixel of the image to which de-noising is applied.

Further embodiments include means for applying brightness enhancement to the image after de-noising to enhance the contrast of the image.

Further embodiments include means for receiving the image from a camera of a computer gesture recognition system, means for performing image de-noising using the image with the replaced pixel intensity, and means for performing gesture recognition on the image after de-noising.

What is claimed is:
1. A computer-implemented method of removing specular shadows from an image, the method comprising:
   placing a window on the image comprising an array of pixels;
   determining a cumulative window distribution function, $S(\ )$, for the window;
   determining a destination histogram for the window;
   determining a cumulative destination distribution function, $D(\ )$, for the destination histogram for the window;
   replacing the intensity of a pixel, p, with the smallest index, i, for which $D(i) > S(p)$;
   repeating, for each window in a plurality of additional windows of the image, determining a cumulative window distribution function, $S(\ )$, for each said window, a destination histogram for each said window, and a cumulative destination distribution function, $D(\ )$, for the histogram for each said window, and replacing the intensity for the pixel, p, with the smallest index, i, for which $D(i) > S(p)$; and
   de-noising the image after repeating by applying a median filter to the image.

2. The method of claim 1, wherein the histogram is linear.

3. The method of claim 2, wherein the linear histogram has a negative slope for a lower half of possible input values and a positive slope for a higher half of possible input values.

4. The method of claim 1, wherein the destination histogram has a neighborhood around the pixel.

5. The method of claim 1, wherein de-noising comprises applying a non-linear function to the image.

6. The method of claim 1, wherein de-noising comprises generating a pilot signal before replacing the intensity of the pixel and applying the pilot signal to the de-noising.

7. The method of claim 6, wherein the pilot signal comprises an equalized gradient magnitude corrected using a median filter.

8. The method of claim 7, wherein the pilot signal determines a blurring radius for each pixel of the image to which de-noising is applied.

9. The method of claim 1, further comprising applying brightness enhancement to the image after de-noising to enhance the contrast of the image.

10. The method of claim 9, wherein the brightness enhancement uses transfer function with a curvature and a fixed destination range.

11. The method of claim 1, further comprising:
   receiving the image from a camera of a computer gesture recognition system;
   performing image de-noising using the image with the replaced pixel intensity; and
   performing gesture recognition on the image after de-noising.

12. A non-transitory computer-readable medium having instructions stored thereon that when operated on by the computer cause the computer to perform operations that remove specular shadows from an image, the method comprising:
   placing a window on the image comprising an array of pixels;
   determining a cumulative window distribution function, S( ), for the window;
   determining a destination histogram for the window;
   determining a cumulative destination distribution function, D( ), for the destination histogram for the window;
   replacing the intensity of a pixel, p, with the smallest index, i, for which D(i)>S(p);
   repeating, for each window in a plurality of additional windows of the image, determining a cumulative window distribution function, S( ), for each said window, a destination histogram for each said window, and a cumulative destination distribution function, D( ), for the destination histogram for each said window, and replacing the intensity for the pixel, p, with the smallest index, i, for which D(i)>S(p); and
   de-noising the image after repeating by applying a median filter to the image.

13. The medium of claim 12, wherein the destination histogram has a neighborhood around the pixel.

14. The medium of claim 12, wherein de-noising comprises applying a non-linear function to the image.

15. The medium of claim 12, wherein de-noising comprises generating a pilot signal before replacing the intensity of the pixel and applying the pilot signal to the de-noising, wherein the pilot signal comprises an equalized gradient magnitude corrected using a median filter and wherein the pilot signal determines a blurring radius for each pixel of the image to which denoising is applied.

16. The medium of claim 12, further comprising applying brightness enhancement to the image after de-noising to enhance the contrast of the image.

17. The medium of claim 12, the operations further comprising:
   receiving the image from a camera of a computer gesture recognition system;
   performing image de-noising using the image with the replaced pixel intensity; and
   performing gesture recognition on the image after de-noising.

18. A computing system comprising:
   a camera to capture an image comprising a plurality of pixels;
   an image processor to place a window on the captured image, to determine a cumulative window distribution function, S( ), for the window, to determine a destination histogram for the window, to determine a cumulative destination distribution function, D( ), for the destination histogram, to replace the intensity of a pixel, p, with the smallest index, i, for which D(i)>S(p), for each window in a plurality of additional windows of the image, determining a cumulative window distribution function, S( ), for each said window, a destination histogram for each said window, and a cumulative destination distribution function, D( ), for the destination histogram for each said window, and replacing the intensity for the pixel, p, with the smallest index, i, for which D(i)>S(p), and to de-noise the image after repeating by applying a median filter to the image; and
   a vision system to recognize a gesture in the de-noised image.

19. The system of claim 18, further comprising a processor to receive the recognized gesture and operate on a command based thereon.

20. The system of claim 18, wherein the image processor is further to enhance the brightness of the image after de-noising by applying a transfer function with a curvature and a fixed destination range.

* * * * *